(12) United States Patent
Szilagyi et al.

(10) Patent No.: US 9,794,957 B2
(45) Date of Patent: Oct. 17, 2017

(54) EFFICIENT MANAGEMENT OF SCHEDULING PARAMETER CHANGES IN RESOURCE LIMITED PROCESSING NODES

(71) Applicant: Nokia Solutions and Networks Oy, Espoo (FI)

(72) Inventors: Peter Szilagyi, Budapest (HU); Csaba Vulkan, Budapest (HU); Norbert Radics, Szekesfehervar (HU)

(73) Assignee: Nokia Solutions and Networks Oy, Espoo (FI)

( * ) Notice: Subject to any disclaimer, the term of this patent is extended or adjusted under 35 U.S.C. 154(b) by 80 days.

(21) Appl. No.: 14/439,686

(22) PCT Filed: Oct. 31, 2012

(86) PCT No.: PCT/EP2012/071578
§ 371 (c)(1),
(2) Date: Apr. 30, 2015

(87) PCT Pub. No.: WO2014/067572
PCT Pub. Date: May 8, 2014

(65) Prior Publication Data
US 2015/0271838 A1    Sep. 24, 2015

(51) Int. Cl.
*H04W 76/02*    (2009.01)
*H04W 72/12*    (2009.01)

(52) U.S. Cl.
CPC ... *H04W 72/1263* (2013.01); *H04W 72/1205* (2013.01); *H04W 76/02* (2013.01)

(58) Field of Classification Search
None
See application file for complete search history.

(56) References Cited

U.S. PATENT DOCUMENTS

2009/0086705 A1*  4/2009  Zisimopoulos ... H04W 72/1268
370/347

FOREIGN PATENT DOCUMENTS

| EP | 2 053 804 A2 | 4/2009 |
| EP | 2 200 390 A2 | 6/2010 |
| EP | 2 239 974 A2 | 10/2010 |
| WO | WO 2008/059361 A2 | 5/2008 |

* cited by examiner

*Primary Examiner* — Kouroush Mohebbi
(74) *Attorney, Agent, or Firm* — Harrington & Smith (57) ABSTRACT

An apparatus and a method are described, by which at least one bearer containing data for a user equipment is received and a connection to the user equipment is provided via a radio access network. Furthermore, transmission of the data for the user equipment is scheduled based on a scheduling parameter associated to the bearer. Moreover, parameter change information associated to the bearer is detected, the parameter change information indicating how the scheduling parameter is to be changed, and the parameter change information for the bearer is stored in the memory.

20 Claims, 5 Drawing Sheets

EFFICIENT MANAGEMENT OF SCHEDULING PARAMETER CHANGES IN RESOURCE LIMITED PROCESSING NODES

FIELD OF THE INVENTION

The present invention relates to an apparatus, a method and a computer program product for providing an efficient management of scheduling parameter changes in resources limited processing nodes, for example SPI changes in resource limited HSPA Node Bs.

RELATED BACKGROUND ART

The following meanings for the abbreviations used in this specification apply:
ARP Allocation/Retention Priority
CmCH-PI Common Transport Channel Priority Indicator
CN Core Network
DPI Deep Packet Inspection
DSCP Differentiated Services Code Point
DT Discard Timer
FC Flow Control
FP Frame Protocol
GBR Guaranteed Bit Rate
GGSN Gateway GPRS Support Node
GPRS General Packet Radio Service
GTP GPRS Tunneling Protocol
HSPA High-Speed Packet Access
HSDPA High-Speed Downlink Packet Access
HS-DSCH High Speed Downlink Shared Channel
ID Identity
IP Internet Protocol
MAC Medium Access Control
PDU Protocol Data Unit
PF-RAD-DS Proportional Fair with Required Activity Detection, Delay Sensitive
QoS Quality of Service
RNC Radio Network Controller
SPI Scheduling Priority Indicator
TCP Transmission Control Protocol
THP Traffic Handling Priority
TS Timestamp
UE User Equipment
WFQ Weighted Fair Queuing Some embodiments of the present invention relate to HSPA systems, although not limited thereon. In HSPA systems, user traffic is delivered through data bearers (bearer services). Core Network (CN) bearers create the logical connectivity between the CN and the Radio Network Controller (RNC), whereas Radio Access Bearers (RAB) are connecting the RNC to the User Equipments (UE). A one-to-one mapping between RABs and CN bearers is done at the RNC, thus realizing an end-to-end Universal Mobile Telecommunications System (UMTS) bearer service. Upon set-up, each bearer is mapped to a Quality of Service (QoS) class, characterized by a well defined parameter set. At bearer setup, the UE can request certain QoS parameters such as guaranteed bit rate (GBR) or traffic class (TC).

Based on that and operator policy settings, the Gateway GPRS Support Node (GGSN) determines additional parameters such as traffic handling priority (THP) and allocation/retention priority (ARP) and signals them to the RNC. The RAB specific QoS parameters, such as scheduling priority indicator (SPI) and discard timer (DT) are set by the RNC based on a mapping provided by the network operator or equipment vendor and signaled to the Node B along with the GBR. The SPI (an integer taking values from the range 0-15) specifies the priority of the data flow served by the bearer and identifies the QoS class the bearer is mapped to. DT gives the maximum allowed waiting time of the flow's packets (before being discarded) at the Node B buffers. The GBR parameter defines the target average bit rate that the air interface packet scheduler at the Node B should try to guarantee to the bearer.

These parameters are used by the Node B packet scheduler upon scheduling decisions and by the HSDPA congestion control mechanism at credit allocation. Once the active bearers receive their GBR, the packet scheduler is supposed to distribute the remaining air interface resources by considering the priority of the bearers. The packet scheduler implemented in the NSN Node Bs use the PF-RAD-DS discipline, which is able to provide the GBR (given that the channel quality of the UE allows it) and to differentiate among the bearers based on an additional parameter, the scheduling weight (wSPI), which is pre-configured in the Node B for each SPI (i.e., not signaled from the RNC). For each bearer, the packet scheduler maintains a mapping of the bearer identity to the SPI of the bearer, which in turn determines the wSPI to be used for that bearer.

Currently, due to network and equipment limitations, the entire data traffic of the users generated by the various applications is served by one data bearer. Since the QoS architecture is bearer centric (each bearer is mapped to one of the 16 QoS classes identified by the SPI), all applications of the user receive the same service, i.e., according to the parameters signaled during the bearer set-up regardless of their different quality requirements; therefore, application specific traffic discrimination is problematic. It is difficult for operators to enforce policies such as separately demoting bulk traffic or promoting premium services or applications. A potential solution is to use application aware mechanisms that are able to provide differentiation among the simultaneous applications run by the users.

A possible application aware mechanism applicable to downlink traffic in HSPA has the scope of dynamically promoting or demoting the data bearer by changing its SPI. As the decision to promote or demote is taken in order to positively or negatively discriminate the applications run by the user, this feature requires an application detection facility in the core network, suitably in the GGSN as this is the node capable of intercepting packets arriving from external networks such as the Internet and investigate their application level content. One possible realization of application detection is Deep Packet Inspection (DPI), which can examine the TCP/IP headers of the user traffic and (or) apply pattern detection to recognize different applications. The result of the detection needs to be conveyed to the radio node where the RAB is originated, i.e., to the RNC, which is able to modify the SPI of the RAB.

The RNC is the best choice also as it is the next entity after the GGSN in downlink that is capable of accessing the application level data is the UE itself. Propagation of the application information from the GGSN can be implemented by mapping the detected applications to priorities and marking the downlink (DL) packets accordingly, e.g., by utilizing the 6-bit Differentiated Services Code Point (DSCP) field of the inner IP header. The marking is thus encapsulated by the GPRS Tunneling Protocol (GTP) and remains hidden from the transport mechanisms on the Gn and Iu-PS interfaces. For priority mapping, the following three levels may be used: middle priority for default traffic, i.e., traffic corresponding to the original QoS settings of the bearer; high priority for traffic to be prioritized; and low priority for traffic to be deprioritized. Generalization to additional priority levels is also possible. The RNC continuously monitors the marking of the packets within a bearer and decides if the SPI of the bearer is to be changed or kept as it is. The logic specifying how to monitor the packets and how to decide about the SPI will be referred to as the SPI change algorithm.

Figure 3:
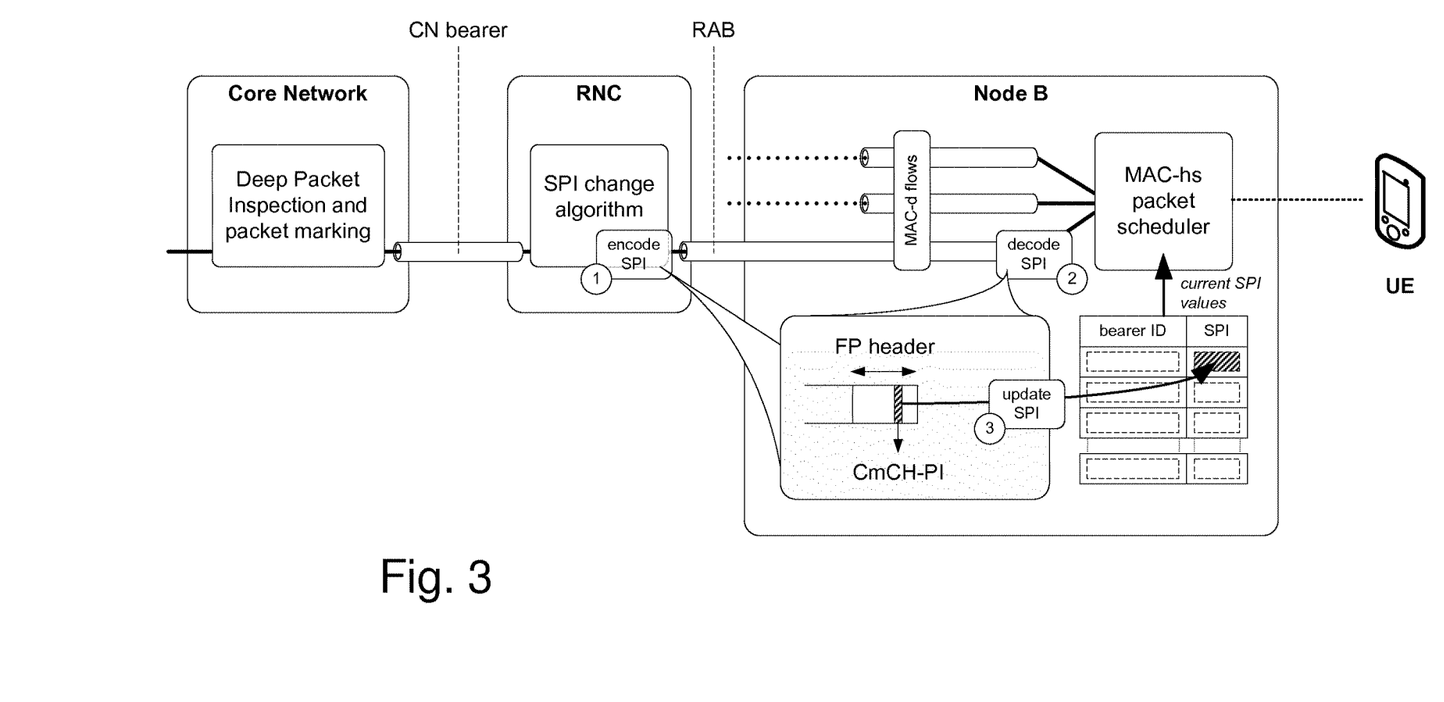
FIG. 3 shows a process of trying to make and SPI change requested by the RNC effective in the Node B immediately according to a prior art example.

The SPI value is encoded by the RNC into the HS-DSCH FP header (CmCH-PI field) that carries the traffic of the bearer from the RNC to the Node B. When processing the FP layer frames, the Node B inspects the actual SPI value encoded in the FP header. In case the SPI signaled by the RNC differs from the current SPI of the bearer, an SPI change request is generated and the related bearer parameters (SPI and wSPI) are updated according to the received SPI as soon as possible, i.e., the processing load of the Node B allows it. This is illustrated in FIG. 3.

Due to the hardware/system limitations, the Node B may be capable of processing only a limited number of SPI changes in a given time interval (e.g., 500 changes per second). If changes are requested more frequently than the rate at which they can be processed (e.g., if the activity of the users is intense that results in a significant number of SPI changes), some of the SPI change requests might not be handled at the right time or at all by the Node B, causing latency in the execution of the bearer promotion/demotion commands and eventually quality and user experience degradation.

Therefore, an intelligent management mechanism is required that is able to cope with the resource limitations while still being able to enforce the decisions of the SPI change algorithm as closely as possible.

SUMMARY OF THE INVENTION

Embodiments of the present invention address this situation and aim to overcome the above-described problems and to provide an efficient management of scheduling parameter changes in resources limited processing nodes, for example SPI changes in resource limited HSPA Node Bs.

According to a first aspect of the present invention, an apparatus is provided which comprises
a first connection unit configured to receive at least one bearer containing data for a user equipment,
a second connection unit configured to provide a connection to the user equipment via a radio access network,
a memory, and
a processor configured
to schedule transmission of the data for the user equipment based on a scheduling parameter associated to the bearer,
to detect parameter change information associated to the bearer, the parameter change information indicating how the scheduling parameter is to be changed, and
to store the parameter change information for the bearer in the memory.

According to a second aspect of the present invention, a method is provided which comprises
receiving at least one bearer containing data for a user equipment,
providing a connection to the user equipment via a radio access network,
scheduling transmission of the data for the user equipment based on a scheduling parameter associated to the bearer,
detecting parameter change information associated to the bearer, the parameter change information indicating how the scheduling parameter is to be changed, and
storing the parameter change information for the bearer in the memory.

Modifications of the first and second aspects are defined in the dependent claims.

According to a third aspect of the present invention, a computer program product is provided which comprises code means for performing a method according to any one of the second aspect and its modifications when run on a processing means or module. The computer program product may be embodied on a computer-readable medium.

Thus, according to embodiments of the present invention, a mechanism is provided by which parameter change information is stored, so that an update of the actual scheduling parameter can be performed independently. In this way, also a large number of parameter change information (e.g., changed SPIs) can reliably be handled.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
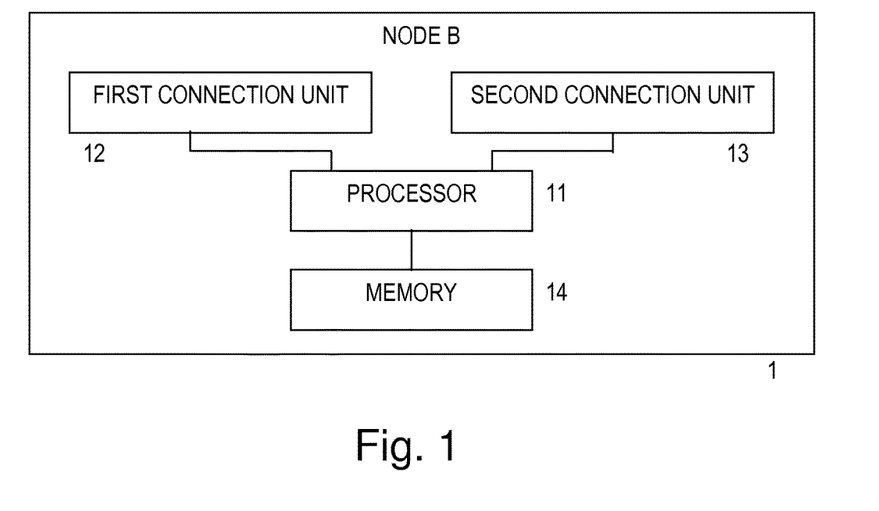
FIG. 1 shows a simplified structure of a Node B according to an embodiment of the present invention.

FIG. 1 shows a Node B as an example for an apparatus applying an embodiment of the present invention. The Node B is only an example, and also other suitable network elements could be applied. Moreover, the apparatus may also be only a part of the network element such as the Node B.

The Node B 1 comprises a processor 11, a first connection unit 12, a second connection unit 13 and a memory 14. The first connection unit 12 is configured to receive at least one bearer containing data for a user equipment, and the second connection unit 13 is configured to provide a connection to the user equipment via a radio access network. The processor 11 is configured to carry out the procedures as described in the following by referring to FIG. 2A.

Optionally, the memory 14 may store further data and programs, by means of which the processor 11 may carry out its corresponding functions.

Figure 2A:
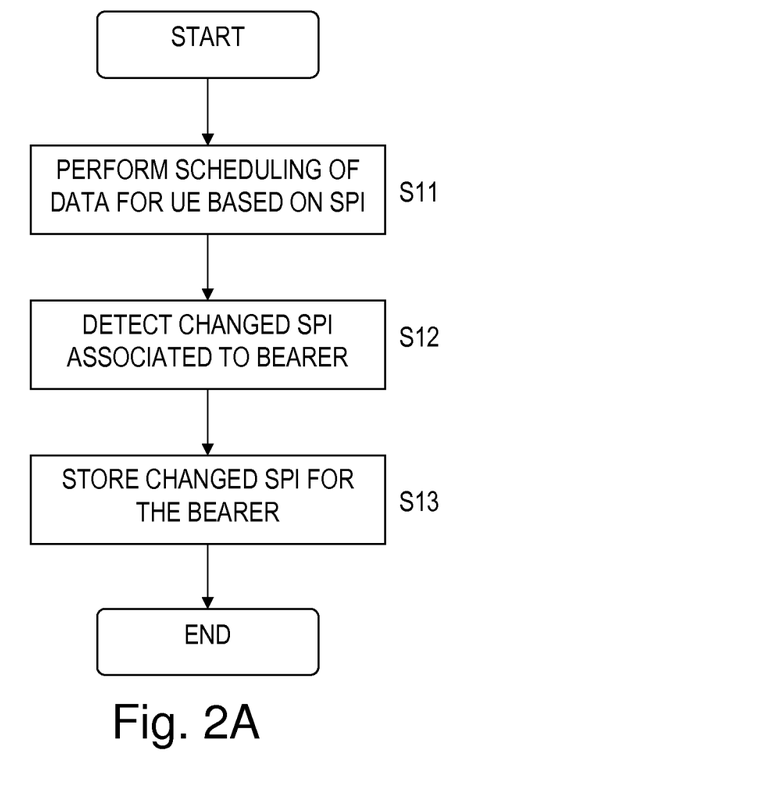
FIGS. 2A and 2B show flowcharts according to an embodiment of the present invention.

As indicated in S11, the processor 11 is configured to schedule transmission of the data for the user equipment based on a scheduling parameter (e.g., the scheduling priority indicator (SPI)). In S12, the processor 11 detects parameter change information (e.g., changed SPI) associated to the bearer, and in S13, the processor 11 stores the parameter changed information for the bearer in the memory 14.

Thus, instead of immediately updating the scheduling parameter (SPI), the parameter change information is stored so that it can be processed later at a timing which is independent from the time of detecting the parameter change information, but is suitable for the operation load on the apparatus or the processor.

It is noted that in the following, embodiments of the invention are described in which the scheduling priority indicator (SPI) is taken as an example for a scheduling parameter. However, the invention is not limited to this, and also other suitable parameter (e.g., guaranteed bit rate (GBR) and the like are possible.

The parameter change information indicates a change of the scheduling parameter, and may be a changed value of the scheduling parameter, such as a changed SPI, for example.

Figure 2B:
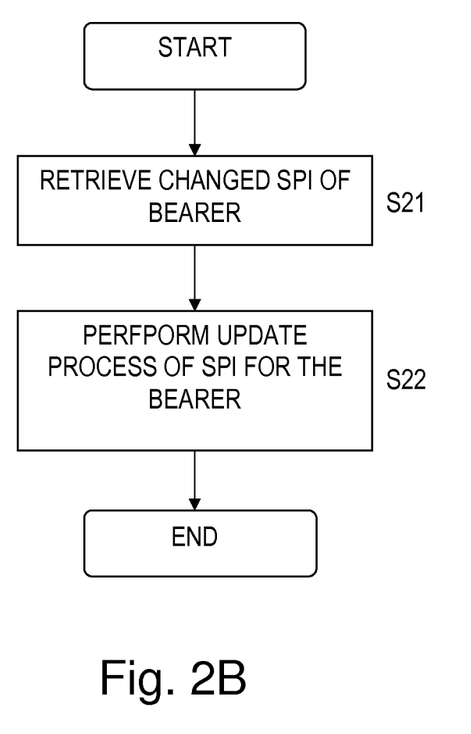

A routine for updating the scheduling parameter (such as SPI) is described in the following by referring to FIG. 2B.

In S21, the stored parameter change information for the bearer is retrieved. In S22, the scheduling parameter for the bearer is updated based on the stored parameter change information.

Hence, the scheduling parameter (such as SPI) associated to a bearer can reliably be updated, namely by separating the process of detecting the changed scheduling parameter and the process of actually updating the scheduling parameter which is used for scheduling transmission of data to the user equipment.

It is noted that the processes described above in connection with FIGS. 2A and 2B may be carried out by the same processor, or by different processors (different apparatuses), respectively.

In the above general embodiment, the bearer may be identified by a bearer identification (e.g., bearer ID), and the parameter change information (e.g., changed SPI) may be stored together with the bearer identification in a table.

In addition, time information (such as a time stamp) of detecting the parameter change information of the bearer may be stored together with the scheduling parameter (e.g., in the table mentioned before). In this way, the process of retrieving the parameter change information and updating the scheduling parameter for the bearer can be carried out by considering the time information as well.

Furthermore, the processor may also detect whether the bearer is active or inactive and retrieve the parameter change information and to update the scheduling parameter for the bearer based on whether the bearer is active or inactive. That is, the process of retrieving and updating may only be carried out when the bearer is active.

In the following, a more detailed embodiment of the present invention is described.

Before explaining this embodiment in detail, it is again referred to the problem to be solved by the embodiment. In particular, according to the present embodiment, an SPI change management algorithm is proposed that provides an efficient mechanism to keep track of the required SPI changes and make sure that the decisions made by the SPI change algorithm in the RNC are enforced in the Node B even in case of limited processing capability, sustaining the benefits of bearer promotion/demotion in a wider range of load/traffic/hardware scenarios than what could be possible without it. It should also be noted that the management algorithm must ensure that when the SPI of a bearer is changed in the Node B, the most up-to-date SPI information (as received from the RNC) is used.

The number of SPI change requests per second, that is, the intensity of the SPI change requests to be processed by a Node B depends on the number of active data bearers, the user behavior, i.e., the applications run simultaneously by the users and the efficiency of the SPI change algorithm implemented at the radio network controller (RNC). If the intensity of the SPI change requests is higher than the processing capability of the Node B, some SPI changes are not executed in time. Without active SPI change request management, the Node B will delay or discard the excess requests in an unpredictable way. As a result, the promotion/demotion will not be executed despite of the decision made in the RNC, causing poor service quality in case of the affected bearers. If the excess SPI change requests are stored, they may be delayed to the extent when their eventual processing causes an effect that is even the opposite of the decision made in the RNC (e.g., only promoting a bearer when actually it has no high priority traffic to transfer).

The proper operation of the bearer promotion/demotion with hardware/system limited Node Bs requires an efficient SPI change request management algorithm, which can cope with the high intensity of SPI change requests by complying with the following guidelines:
1. When the SPI value of a bearer is actually changed in the Node B, the new SPI value must be equal to the latest SPI received in the HS-DSDH FP header for the given bearer.
2. The starvation of the bearers must be avoided, i.e., when the SPI change requests of a bearer are not processed for a long time.

The method proposed according to the present embodiment provides an efficient solution for the problem fulfilling the above conditions, as will be explained in the following.

According to the operation of bearer promotion/demotion, the actual SPI of each bearer is encoded by the RNC to the CmCH-PI field of the HS-DSCH Frame Protocol header. The proposed SPI change management mechanism runs in the Node B and it takes over the task of decoding the SPI from the FP header. When a new SPI is detected, it is recorded along with a timestamp (TS) value in an intermediate lookup table instead of attempting to be processed (i.e., updated to the table of current SPIs used by the MAC-hs packet scheduler) immediately. The actual SPI changes are executed by an entity referred to as the server process, which may have only a limited capacity for processing SPI changes, depending on the processing load (which may or may not be related to performing SPI changes) the Node B has to handle.

An example for the lookup table is shown in the following Table 1. In detail, for each bearer, two data fields are maintained in the lookup table by the SPI change management mechanism. The first field is referred to as the SPI, representing the newest SPI value signaled by the RNC for the bearer. The second field is called TS, storing the time when the earliest unhandled SPI change request was detected for the bearer. One such entry is created for each bearer when it is established and it is deleted when the bearer is released.

TABLE 1

Example per-bearer data entries in the lookup table

| bearer ID | SPI | TS |
|---|---|---|
| 1 | 2 | 16:12:54.582 |
| 2 | — | invalid |
| ... | ... | ... |
| N | 2 | 16:12:53.956 |

The proposed SPI change management has two tasks:
1. bookkeeping of the SPI change requests: registering the SPI change requests when an SPI change is detected and the server process is busy, e.g., with the execution of another SPI change or with some other (not SPI change related) processing activity;
2. selection of the next eligible bearer/SPI change request: when the server returns to the table, the selection of the bearer with a new SPI that is to be processed (i.e., updated to the scheduler) by the server process.

Figure 4:
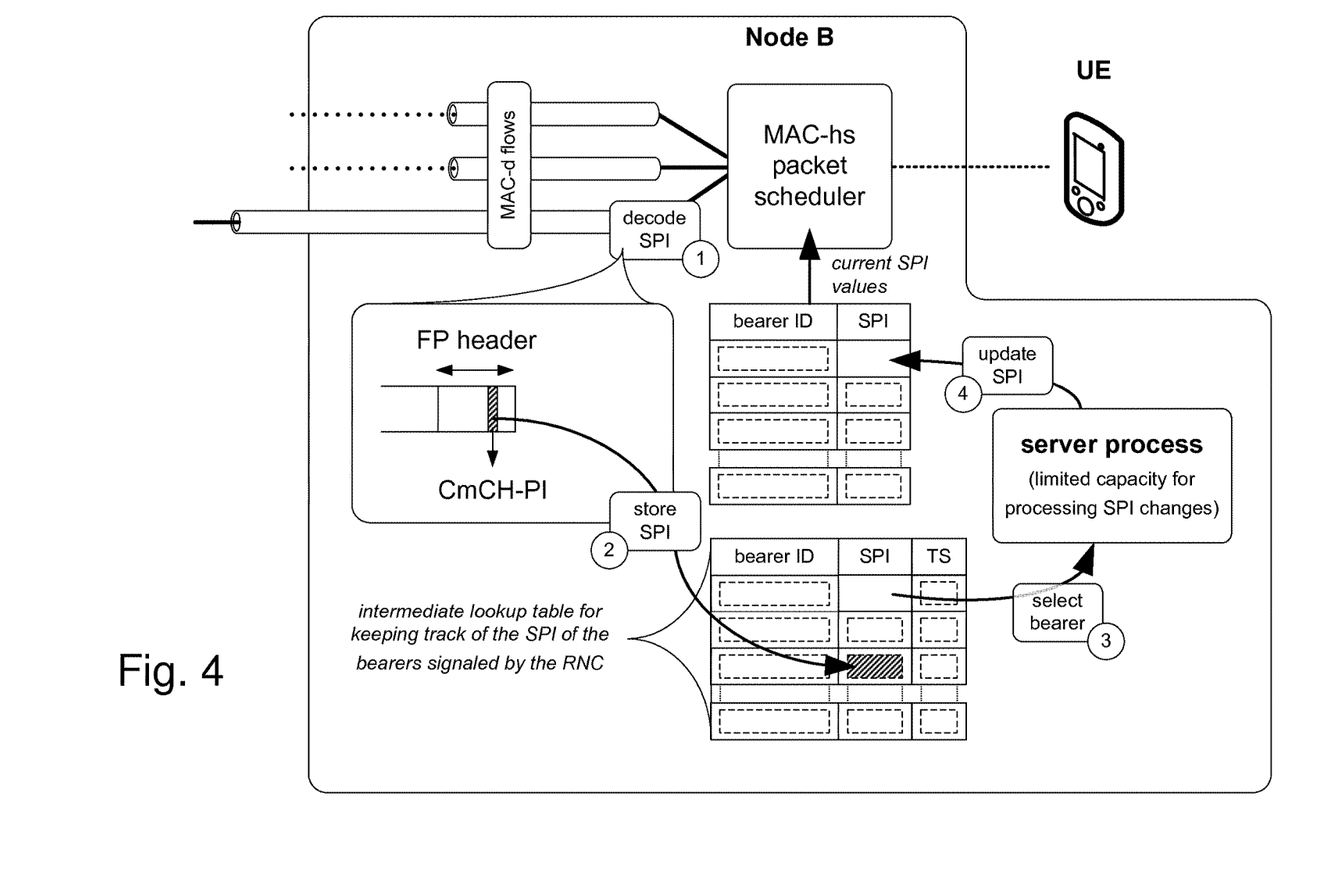
FIG. 4 shows a SPI change management mechanism according to an embodiment of the present invention.

The architecture of the solution is depicted in FIG. 4.

The SPI changes are decoded and stored separately for each bearer in the lookup table in the Node B. The goal of the SPI change management is to ensure that the MAC-hs packet scheduler at the Node B operates according to the most up-to-date information available about the SPI of each bearer. If multiple SPI change requests are detected for the same bearer while the server process is busy, the SPI value representing the actual decision of the RNC is contained by the most recent SPI change request received by the Node B. Therefore, when an SPI change request is detected for a bearer which already has a pending SPI change in the lookup table, the SPI stored in the table is simply overwritten by the newer SPI but the time stamp (TS) is not updated.

Those MAC-d PDUs that were enqued with the previous (overwritten) SPI in the bearer have either been transmitted already, in which case they are not impacted by dropping the previous SPI in favor of the new one, or they are still buffered in the Node B, in which case they will receive a treatment corresponding to the new SPI as soon as the SPI of the bearer is updated from the table to the MAC-hs scheduler. However, as the HSPA FC algorithm keeps the length of the MAC-d queues short via its credit allocation mechanism, the number of impacted MAC-d PDUs is low; also, note that these PDUs would not have received the correct treatment without using the SPI management either.

When the server returns to the table, the SPI change management should select the next bearer with a pending SPI change request, i.e., for which a new SPI value has been received from the RNC. The selection of the bearer to be served among the possible candidates is based on how long each bearer has had unhandled SPI change requests. According to this principle, the TS value in the table records the time when the earliest SPI change for the corresponding bearer has been detected. Therefore, when the server returns to the table, the bearer with the longest waiting time (i.e., smallest timestamp) should be selected and the SPI stored for the bearer in the table should be set as the current SPI of the bearer. By this selection mechanism, the starvation of the bearers (i.e., if the pending requests of a bearer are not processed for a long time) is avoided.

Initially, when no SPI change request has been detected for a bearer so far, the corresponding TS field is set to a special token referred to as "invalid". When an SPI change request is detected for a bearer, its TS field is set to the current time and its SPI field is set to the new SPI value decoded from the FP header. If more than one SPI change requests have been detected for the same bearer before it is selected for the server process, the TS field is updated only at the detection of the first SPI change request and its value is kept unchanged upon recording the subsequent SPI change requests; in these latter cases, only the new SPI value is written into the corresponding SPI field.

When the server process becomes ready to perform an SPI change, the bearer having the lowest TS field is selected to be served next (bearers with "invalid" TS field are excluded from the selection). Consequently, the TS field of the selected bearer is reset to "invalid", representing a state when the SPI signaled by the RNC and the SPI actually used for packet scheduling are identical. The TS field should also be set to "invalid" when the new SPI signaled by the RNC is the same as the current SPI used by the MAC-hs scheduler in order to avoid keeping up the demand for a bearer whose SPI effectively does not need to be changed (this can happen, e.g., if there is a very short burst of high/low priority traffic, triggering subsequent promotion and demotion within a small period of time).

Additionally to the TS field of the bearers, the activity of the bearers can also be considered during the selection of the next bearer for updating its SPI: until there are active bearers with pending SPI change requests from the RNC (i.e., with not "invalid" TS field), the active bearer with the lowest TS field among the other active bearers is selected. Inactive bearers should only be selected if there are no more active bearers with pending SPI change requests. This ensures that SPI change requests with actual impact are prioritized and performed before less important ones. Note that excluding the inactive bearers from the selection does not cause the starvation of the bearers, as keeping the current SPI unchanged for the inactive bearers does not influence the packet scheduling due to the PF-RAD principle of the scheduler.

An inactive bearer becomes active when a HS-DSCH frame arrives in it. This frame—as usual—contains the SPI of the bearer as set by the RNC. If this new SPI is already the same as the one used by the MAC-hs scheduler for the bearer, the bearer's TS field should be set to "invalid" in the table to clear any obsolete requests. If the new SPI is different from the one used by the MAC-hs scheduler but the same as the bearer's SPI field in the table, it means that the previous pending SPI change request for the bearer is still valid; therefore, neither the TS nor the SPI field should be changed in order to keep up the request with the old timestamp. Finally, if the new SPI set by the RNC is different from both the one used by the scheduler and the bearer's SPI field, the TS and SPI fields should both be updated (i.e., TS is set to the current time and SPI is set to the new SPI), effectively recording a new SPI change request.

Hence, according to the above-described embodiment of the present invention, an SPI change management algorithm is proposed that provides an efficient mechanism to keep track of the required SPI changes and make sure that the decisions made by the SPI change algorithm in the RNC are enforced in the Node B even in case of limited processing capability.

It is noted that the embodiments and the present invention in general is not limited to the specific examples given above.

For example, in the above embodiments, the management of SPI changes was described. However, similar also changes in other parameters relevant for packet scheduling can be managed. Such parameters may include QoS parameters such as a guaranteed bit rate (GBR) etc. Another example could be the change of per-bearer shaping rates in case there is a traffic shaper in the Node B (or in another node such as the gateway); changing the weight of a WFQ scheduler if that is dynamically updated based on a condition; etc.

Furthermore, as mentioned above, the parameter change information may be a changed value of the scheduling parameter itself (such as a changed SPI, as described above). However, alternatively the parameter change information may only indicate how the scheduling parameter is to be changed (e.g., that in case of a bit rate, the bit rate is to be lowered or increased, or the like).

Thus, according to some embodiments of the present invention, an apparatus and a method are described, by which at least one bearer containing data for a user equipment is received and a connection to the user equipment is provided via a radio access network. Furthermore, transmission of the data for the user equipment is scheduled based on a scheduling parameter associated to the bearer. Moreover, parameter change information associated to the bearer is detected, the parameter change information indicating how the scheduling parameter is to be changed, and the parameter change information for the bearer is stored in the memory.

According to a further aspect of embodiments of the present invention, an apparatus is provided which comprises
- means for receiving at least one bearer containing data for a user equipment,
- means for providing a connection to the user equipment via a radio access network,
- means for scheduling transmission of the data for the user equipment based on a scheduling parameter associated to the bearer,
- means for detecting parameter change information associated to the bearer, the parameter change information indicating how the scheduling parameter is to be changed, and
- means for storing the parameter change information for the bearer in the memory.

It is to be understood that any of the above modifications can be applied singly or in combination to the respective aspects and/or embodiments to which they refer, unless they are explicitly stated as excluding alternatives.

For the purpose of the present invention as described herein above, it should be noted that
- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), WCDMA/HSPA, HSPA+, LTE, LTE-A, Bluetooth, Zigbee, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element (station) may be any device, apparatus, unit or means by which a system user or subscriber may experience services from an access network, such as a mobile phone or smartphone, a personal digital assistant PDA, or computer, or a device having a corresponding functionality, such as a modem chipset, a chip, a module etc., which can also be part of a UE or attached as a separate element to a UE, or the like;
- method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
a first connection unit configured to receive at least one bearer containing data for a user equipment,
a second connection unit configured to provide a connection to the user equipment via a radio access network, a memory including computer program code, and a processor, wherein the memory and the computer code are configured, with the processor, to cause the apparatus at least:

to schedule transmission of the data for the user equipment based on a scheduling parameter associated to the bearer;

to detect parameter change information associated to the bearer, the parameter change information indicating how the scheduling parameter is to be changed; and to store the parameter change information for the bearer and time information indicating the time of detecting the parameter change information in the memory.

2. The apparatus according to claim 1, wherein the memory and the computer code are configured, with the processor, to further cause the apparatus at least:

to retrieve the stored parameter change information for the bearer from the memory; and to update the scheduling parameter for the bearer based on the stored parameter change information.

3. The apparatus according to claim 2, wherein the memory and the computer code are configured, with the processor, to further cause the apparatus at least:

to detect whether the bearer is active or inactive; and to retrieve the parameter change information and to update the scheduling parameter for the bearer based on whether the bearer is active or inactive.

4. The apparatus according to claim 1, wherein the memory and the computer code are configured, with the processor, to further cause the apparatus at least:

to retrieve the parameter change information and to update the scheduling parameter for the bearer based on the time information.

5. The apparatus according to claim 4, wherein the memory and the computer code are configured, with the processor, to further cause the apparatus at least:

to detect, when parameter change information for a bearer is received, whether there is already parameter change information stored for this bearer; and to store the new parameter change information and to maintain the time information of the previously stored parameter change information, when there is already parameter change information stored for this bearer.

6. The apparatus according to claim 1, wherein the memory and the computer code are configured, with the processor, to further cause the apparatus at least:

to set the time information for the bearer to invalid in case there is no parameter change information for this bearer.

7. The apparatus according to claim 1, wherein the time information comprises a time stamp and the bearer is identified by a bearer identification, and wherein the processor is configured to store the parameter change information together with the bearer identification and the time stamp in a table in the memory.

8. The apparatus according to claim 1, wherein the scheduling parameter comprises at least one of a scheduling priority indicator, a guaranteed bit rate, a pre-bearer shaping rate and a weight of a weighted fair queuing scheduler.

9. A method comprising:

receiving at least one bearer containing data for a user equipment, providing a connection to the user equipment via a radio access network;

scheduling transmission of the data for the user equipment based on a scheduling parameter associated to the bearer;

detecting parameter change information associated to the bearer, the parameter change information indicating how the scheduling parameter is to be changed; and storing the parameter change information for the bearer and time information indicating the time of detecting the parameter change information in the memory.

10. The method according to claim 9, further comprising:

retrieving the stored parameter change information for the bearer; and updating the scheduling parameter for the bearer based on the stored parameter change information.

11. The method according to claim 10, further comprising:

detecting whether the bearer is active or inactive; and retrieving the parameter change information and updating the scheduling parameter for the bearer based on whether the bearer is active or inactive.

12. The method to claim 9, further comprising:

retrieving the parameter change information and to updating the scheduling parameter for the bearer based on the time information.

13. The method according to claim 12, further comprising:

detecting, when parameter change information for a bearer is received, whether there is already parameter change information stored for this bearer; and storing the new parameter change information and maintaining the time information of the previously stored parameter change information, when there is already parameter change information stored for this bearer.

14. The method according to claim 9, further comprising:

setting the time information for the bearer to invalid in case there is no parameter change information for this bearer.

15. The method according to claim 9, wherein the time information comprises a time stamp and the bearer is identified by a bearer identification, and wherein the method further comprises:

storing the parameter change information together with the bearer identification and the time stamp in a table.

16. The method according to claim 9, wherein the scheduling parameter comprises at least one of a scheduling priority indicator, a guaranteed bit rate, a pre-bearer shaping rate and a weight of a weighted fair queuing scheduler.

17. A computer program product embodied on a non-transitory computer-readable medium in which a computer program is stored that, when being executed by a computer, is configured to provide instructions to control or carry out the method of claim 9.

18. An apparatus comprising:

at least one processor and at least one memory including computer program code, wherein the at least one memory and the computer code are configured, with the at least one processor, to cause the apparatus to at least perform the following:

receiving at least one bearer containing data for a user equipment, providing a connection to the user equipment via a radio access network;

scheduling transmission of the data for the user equipment based on a scheduling parameter associated to the bearer;

detecting parameter change information associated to the bearer, the parameter change information indicating how the scheduling parameter is to be changed; and storing the parameter change information for the bearer and time information indicating the time of detecting the parameter change information in the memory.

19. The apparatus of claim 18, wherein the at least one memory and the computer code are further configured, with the at least one processor, to cause the apparatus to at least further perform the following:

retrieving the parameter change information and updating the scheduling parameter for the bearer based on the time information.

20. The apparatus of claim 18, wherein the at least one memory and the computer code are further configured, with the at least one processor, to cause the apparatus to at least further perform the following:

setting the time information for the bearer to invalid in case there is no parameter change information for this bearer.

* * * * *

UNITED STATES PATENT AND TRADEMARK OFFICE
CERTIFICATE OF CORRECTION

PATENT NO.        : 9,794,957 B2
APPLICATION NO.   : 14/439686
DATED             : October 17, 2017
INVENTOR(S)       : Peter Szilagyi, Csaba Vulkan and Norbert Radics Page 1 of 1

It is certified that error appears in the above-identified patent and that said Letters Patent is hereby corrected as shown below:

In Claim 12:
Column 12, Line 18, "to" should be deleted and --according to-- should be inserted.

In Claim 12:
Column 12, Line 19, "to" should be deleted.

Signed and Sealed this
Twenty-first Day of November, 2017

Joseph Matal
*Performing the Functions and Duties of the
Under Secretary of Commerce for Intellectual Property and
Director of the United States Patent and Trademark Office*